United States Patent [19]

Hoffman

[11] Patent Number: 5,170,978
[45] Date of Patent: Dec. 15, 1992

[54] POT LID HOLDER

[76] Inventor: Frederick A. Hoffman, 602 Apollo Pkwy., Westfield, Ind. 46074

[21] Appl. No.: 818,335

[22] Filed: Jan. 9, 1992

[51] Int. Cl.⁵ .............................................. A47F 5/00
[52] U.S. Cl. ............................. 248/309.1; 248/205.3
[58] Field of Search ..................... 248/309.1, 310, 314, 248/339, 301, 303, 304, 305, 322, 311.2, 205.3, 683, 110, 113, 317; 211/88

[56] References Cited

U.S. PATENT DOCUMENTS

| | | |
|---|---|---|
| 3,192,894 | 7/1965 | Staver .............................. 248/314 X |
| 4,136,848 | 1/1979 | McCollum . |
| 4,312,455 | 1/1982 | Weber .......................... 248/205.3 X |
| 4,936,536 | 6/1990 | Meneghello ..................... 248/909 X |
| 5,038,945 | 8/1991 | Melkonian ............................. 211/96 |
| 5,048,677 | 9/1991 | Pedracine .................... 248/309.1 X |

OTHER PUBLICATIONS

Copy of Rubbermaid brochure 15(1-21) AD#5139 PROG O Copy of 1991 Carol Wright Gifts brochure.

Primary Examiner—Ramon O. Ramirez
Attorney, Agent, or Firm—Woodard, Emhardt, Naughton, Moriarty & McNett

[57] ABSTRACT

A pot lid holder. The holder includes a main body with an outwardly opening slot located at one end of the main body through which the vertically extending handle of a lid may be extended and held. The opposite end of the main body includes an end wall extending upwardly from the main body bottom wall forming an horizontally extending recess into which the horizontally extending portion of a handle of a lid may be extended and held. One version has a pair of walls extending upwardly from a bottom wall with the pair of walls attached to a top wall securable to a shelf. A second version has an arm extending upwardly from the bottom wall with the arm attachable to the shelf.

17 Claims, 4 Drawing Sheets

POT LID HOLDER

BACKGROUND OF THE INVENTION

1. Field of the Invention

This invention is in the field of brackets for holding various items.

2. Description of the Prior Art

A variety of brackets have been designed to removably hold different types of tools, utensils and miscellaneous items. For example, U.S. Pat. No. 4,136,848 discloses a bracket mountable to a wall for holding a fishing pole. Such brackets generally are not readily available for use in holding and sorting lids for kitchen pots. Instead, kitchen pots and lids are stored in cabinets in a random manner providing a messy and cluttered appearance. I have therefore designed a bracket which may be used to removably hold a pot lid in an optimum manner. The bracket is designed to be mounted beneath a shelf or the top wall of the cabinet thereby allowing for storage of the lids in an area that is normally not utilized. The bracket includes a dual mounting capability for storing lids with different shaped handles.

SUMMARY OF THE INVENTION

A bracket for hanging to a horizontal wall a lid with a handle including a main body including an upper portion mountable to and beneath the horizontal wall. The main body further including a lower portion spaced apart from the upper portion with the lower portion including a second wall forming a vertical holder operable to removably hold and position the handle in a vertical position to secure the lid to the horizontal wall and further including a third wall defining a horizontal holder operable to removably hold and position the handle in a horizontal position to secure the lid to the horizontal wall when not held by the first wall.

It is an object of the present invention to provide a new and improved bracket for holding a pot lid or other such device.

A further object of the present invention is to provide a bracket for holding a pot lid having either a vertically extending handle or a horizontally extending handle.

In addition, it is an object of the present invention to provide a pot lid holder allowing for the organization and storing of pot lids while maximizing the use of air space within a cabinet.

A further object of the present invention is to provide a pot lid holder for storing lids allowing for quick selection.

Related objects and advantages of the present invention will be apparent from the following description.

DESCRIPTION OF THE PREFERRED EMBODIMENTS

Figure 1:
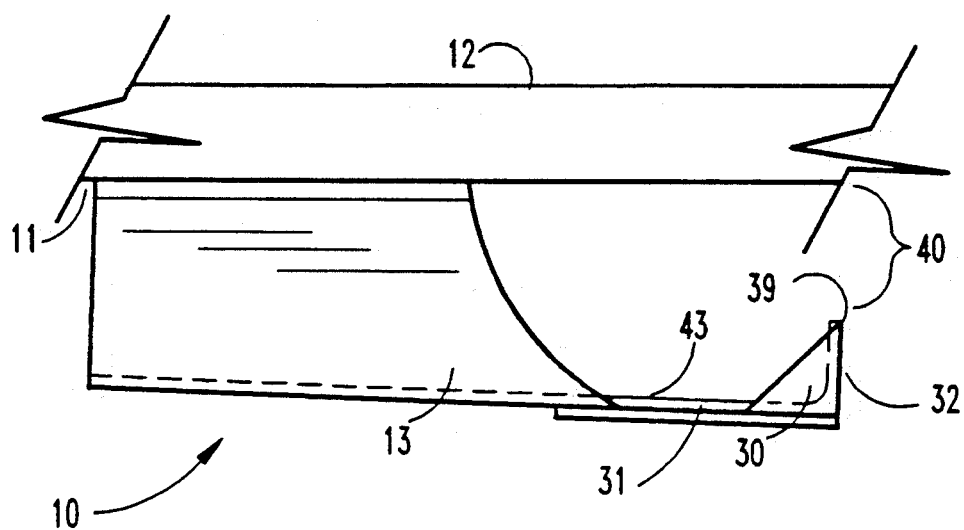
FIG. 1 is a side view of the preferred embodiment of the pot lid holder incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
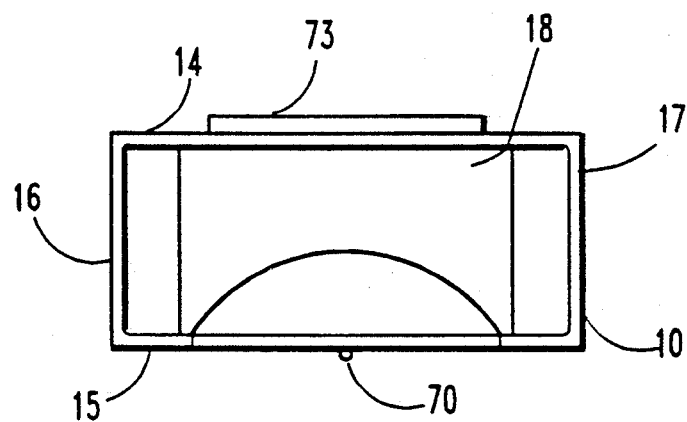
FIG. 2 is a left side view of the pot lid holder of FIG. 1.
Figure 3:
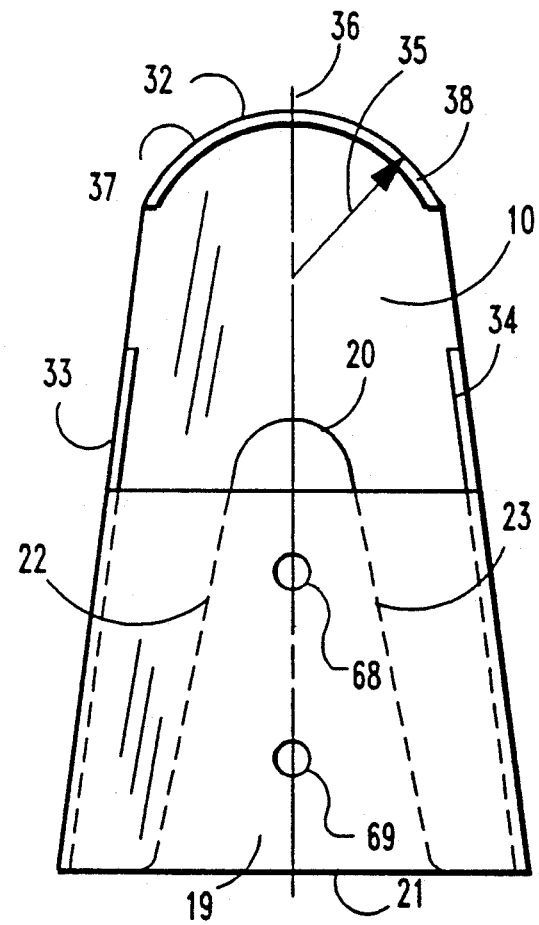
FIG. 3 is a top view of the pot lid holder of FIG. 2.

Referring now more particularly to FIG. 1-3, there is shown the preferred embodiment of the pot lid holder incorporating the present invention. Pot lid holder 10 is shown fixedly mounted to the bottom surface 11 of shelf 12 typically located within a kitchen cabinet. The pot lid holder 10 is a bracket for holding a utensil with a handle and includes a main body 13 configured as a four-sided channel and including an upper wall 14, lower wall 15, and a pair of side walls 16 and 17 integrally joined together and defining a hollow interior 18. The main body may be formed from plastic thereby providing an integral one-piece construction.

Bottom wall 15 has an outwardly opening slot 19 to receive and hold a vertically extending handle of a utensil such as a pot lid while positioning the handle within the hollow interior 18 formed between the bottom and top walls of the bracket. Slot 19 includes a closed end 20 and an open end 21 with the slot edges 22 and 23 of bottom wall 15 converging in a direction from open end 21 to closed end 20. Thus, the vertically extending handle 24 of lid 25 (FIG. 6) may be extended into slot 19 thereby positioning the headed top end 26 of the handle within interior 18 with the vertically extending portion 24 of the handle engaging the mutually facing and vertically extending stop surfaces of edges 22 and 23 with the bottom surface of the enlarged handled head 26 resting atop the interior surface of bottom wall 15 immediately adjacent edges 22 and 23.

Side walls 16 and 17 have a height extending from bottom wall 15 to top wall 14 greater at the location adjacent slot open end 21 as compared to the height of the side walls at the location near the closed end 20 of the slot. As a result, bottom wall 15 is not parallel to top wall 14 but instead diverges therefrom in a direction from the open end 21 of the slot to the closed end 20. Thus, when the top wall 14 is mounted to the bottom surface of a horizontally extending shelf 12, the vertically extending handle of lid 25 is urged by gravity against the closed end 20 of the slot.

An upwardly extending hook shaped wall 30 is integrally connected to bottom wall 15 and extends outwardly of the four-sided main body 13 at an end of the main body opposite the open end 21 of slot 19. The hook shaped wall 30 includes a flat wall or flat portion 31 co-planar with bottom wall 15 and integrally connects bottom wall 15 to the upwardly extending distal end 32 of hook shaped wall 30. Side walls 16 and 17 terminate and slant downward from top wall 14 to bottom wall 15 in a direction toward distal end 32 thereby defining a first pair of stop surfaces 33 and 34. Distal end 32 is symmetrical about the longitudinal axis 36 extending centrally through main body 13 and is curved being formed by radius 35 pivoting about a point located on axis 36. Distal end 32 has its greatest vertical height as it crosses axis 36 and slants downwardly on the opposite sides thereof to flat portion 31 providing a second pair of stop surfaces 37 and 38. Thus, the first pair of stop surfaces 33 and 34 diverge relative to the second pair of stop surfaces 37 and 38 in a direction from flat portion 31 to shelf 12. The upper tip 39 of distal end 32 is spaced apart from the bottom surface 11 of shelf 12 forming a gap 40 through which the horizontally extending portion 74 of handle 41 (FIG. 7) of lid 42 may be extended and then located atop the upwardly facing surface 43 of flat portion 31 resting between the first pair of stop surfaces 33 and 34 and the second pair of stop surfaces 37 and 38.

Mounting means 73 (FIG. 2) in the form of double-sided adhesive tape is secured to the upper surface of top wall 14 to secure the bracket to the bottom surface of shelf 12. Means 73 has been omitted from FIG. 3 in order to illustrate a pair of holes 68 and 69 extending through wall 14 to receive conventional fastening devices to provide alternate mounting means. A rib 70 is integrally formed on the bottom of flat portion 31 and extends outwardly to the distal end thereby providing rigidity for the hook shaped distal end.

Figure 5:
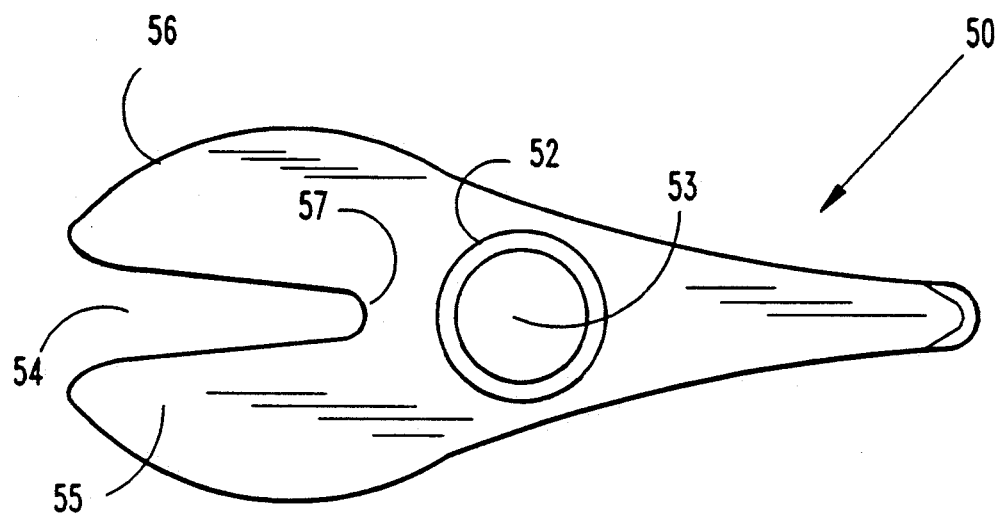
FIG. 5 is a top view of the pot lid holder of FIG. 4.
Figure 4:
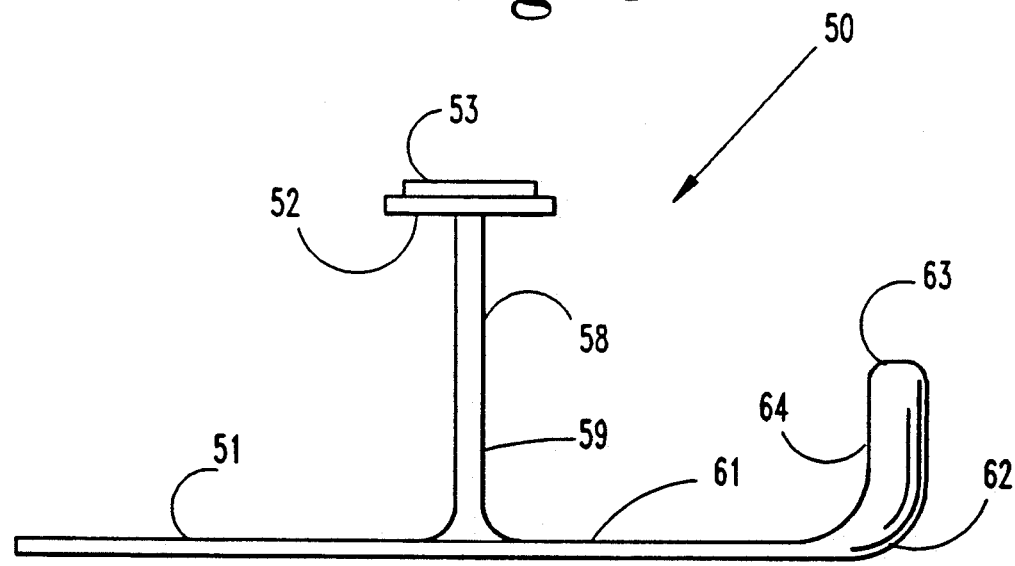
FIG. 4 is a side view of an alternate embodiment of the pot lid holder incorporating the present invention.
Figure 6:
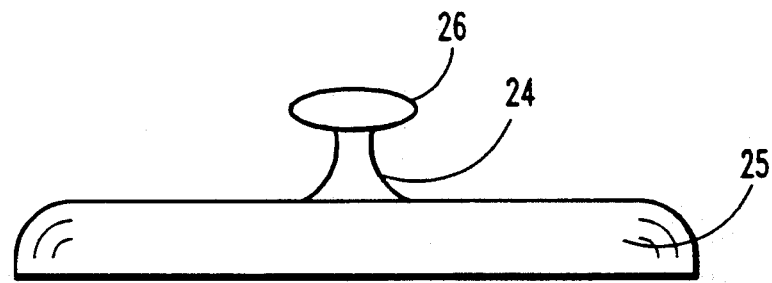
FIG. 6 is a side view of a typical pot lid having a knob-shaped handle.
Figure 7:
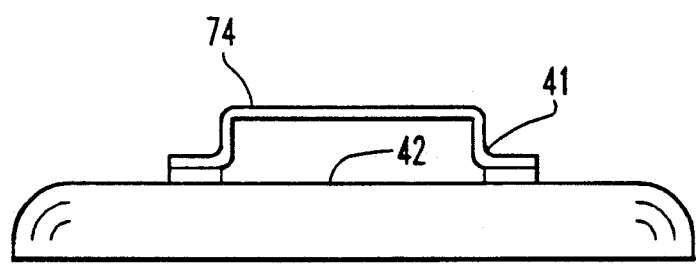
FIG. 7 is a side view of a typical pot lid having a handle a portion of which extends horizontally.

An alternate embodiment of the pot lid holder is shown in FIGS. 4 and 5 and likewise is provided with a dual means for holding the lids of FIGS. 6 or 7. Lid holder 50 includes a sheet configured main body 51 integrally attached by an upwardly extending arm 58 to a flange 52 having the double-sided adhesive strip 53 provided thereon facilitating the mounting of flange 52 to the lower surface 11 of shelf 12. Located at one end of main body 51 are a pair of outwardly extending arms 55 and 56 forming slot 54 for receiving the vertically extending handle 24 of lid 25. The sheet main body 51 may be oriented at a slight angle relative to a vertical axis extending upwardly through arm 58 so as to position the closed end 57 of slot 54 at a slight elevation lower than the open end of the slot and thereby insuring that the handle of lid 25 rests against closed end 57.

A flat wall 61 is integrally connected to sheet configured main body 51 and extends aft of arm 58 having an upwardly facing surface to receive the horizontally extending portion 74 of handle 41 of lid 42. Distal end 62 extends upwardly having a top end 63 located beneath but spaced apart from the bottom surface 11 of shelf 12 allowing handle 41 to be moved between end 63 and the shelf and then placed atop wall 61. The mutually facing surfaces 59 and 64 of arm 58 and distal end 62 extend downward toward surface 61 providing a pair of stop surfaces to limit movement of the handle relative to the lid holder.

Many advantages of the present invention will be apparent from the prior description. For example, the pot lid holder solves a major problem in most households of disorganization. By using the holder one will be able to greatly organize the kitchen and the storing of pot lids and maximize the use of air space within a cabinet. The holder solves the problem of finding quickly the right lid for the right pot without the noisy, backbreaking daily job searching through a pile of lids. The glass or metal lids will be separated thus increasing the life of the lid and the surface finish. Normally wasted shelf space will be eliminated. The holder is small, compact, durable and easy to manufacture in economical fashion. Because of the low profile of the bracket, it does not interfere with other items on the shelf and still provides easy access whereas prior brackets typically occupy a great amount of space. The holder disclosed herein can be produced from numerous materials with a variety of colors or surface finishes. The holder can be produced for over the edge mounting. Likewise, the holder may be utilized to mount items other than pot lids so long as the objects or utensils include a knob or handle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A bracket for hanging to a horizontal wall a lid with a handle comprising:

a main body including an upper portion mountable to and beneath said horizontal wall, said main body further including a lower portion spaced apart from said upper portion with said lower portion including first means forming a vertical holder operable to removably hold and position a handle of a lid in a vertical position to secure said lid to said wall and second means defining a horizontal holder operable to removably hold and position a handle of a lid in a horizontal position to secure same to said wall; and, mounting means operable to fixedly mount said upper portion with said main body to said horizontal wall; and wherein:

said first means is an outwardly opening slot.

2. A bracket for hanging to a horizontal wall a lid with a handle comprising:

a main body including an upper portion mountable to and beneath said horizontal wall, said main body further including a lower portion spaced apart from said upper portion with said lower portion including first means forming a vertical holder operable to removably hold and position a handle of a lid in a vertical position to secure said lid to said wall and second means defining a horizontal holder operable to removably hold and position a handle of a lid in a horizontal position to secure same to said wall; and, mounting means operable to fixedly mount said upper portion with said main body to said horizontal wall; and wherein:

said second means is an upwardly curved hooked shaped end of said main body defining a horizontally extending supporting surface.

3. The bracket of claim 2 wherein:
said first means is an outwardly opening slot.

4. The bracket of claim 3 wherein:
said main body has a hollow elongated configuration with an upper wall and a lower wall joined together with said upper wall having an upper surface contactable against said horizontal wall and with said lower wall including said outwardly opening slot formed thereon, said upper wall spaced apart from said lower wall enabling a handle to be positioned therebetween when vertically extending through said slot.

5. The bracket of claim 3 wherein:
said upper portion includes a vertically extending arm with a flange formed thereon securable to said horizontal wall, said lower portion is a lower wall joined to said arm, said lower wall includes said outwardly opening slot formed thereon, said flange spaced apart from said lower wall enabling said handle to be positioned therebetween when vertically extending through said slot, said lower wall extends outwardly of said flange forming a hooked shaped end with said hooked shaped end located opposite of said slot, said slot having a closed end and an open end, said lower wall positioned relative to said flange to locate said lower wall at an angle relative to said flange and said horizontal wall with said lower wall extending downwardly from said open end to said closed end of said slot and allowing said handle to normally rest adjacent said closed end.

6. The bracket of claim 4 wherein:
said lower wall has a length greater than said upper wall extending outwardly thereof and forming said hooked shaped end with said lower wall having a second end forming said slot opposite of said hooked shaped end.

7. The bracket of claim 6 wherein:
said slot has a closed end and an open end;
said upper wall and said lower wall are located in divergent planes positioning said lower wall at an angle relative to said upper wall and said horizontal wall with said lower wall extending downwardly from said open end to said closed end of said slot and allowing a handle to normally rest adjacent said closed end.

8. The bracket of claim 7 wherein:
said lower wall extends convergingly along said slot from said open end to said closed end.

9. A bracket for holding a utensil with a handle comprising:
a four sided channel with an upper wall extending in an upper plane, a lower wall and a pair of side walls joining said upper wall to said lower wall and defining a hollow interior, said lower wall including an outwardly opening slot to receive and hold a handle of a utensil and position said handle within said hollow interior;
an upwardly extending hooked shaped wall attached to said lower wall of said four sided channel and located at an end opposite of the location of said slot, said hooked shaped wall defining an upwardly facing surface upon which a handle of a utensil may be supported; and,
mounting means operable to secure and mount said upper wall in a fixed and stationary position locating said upper wall in a horizontal plane.

10. The bracket of claim 9 wherein:
said lower wall extends upwardly from said hooked shaped wall to said slot when said upper wall is positioned horizontally by said mounting means, said slot includes a open end and a closed end with said closed end located closer to said hooked shaped wall than said open end allowing a handle located in said slot to normally rest against said closed end.

11. The bracket of claim 10 wherein:
said hooked shaped wall includes a flat portion coplanar with said lower wall and an outer distal end joined to said lower wall by said flat portion, said side walls extend downwardly from said upper wall toward said flat portion in a direction toward said distal end defining a first pair of stop surfaces, said distal end extends upwardly from said flat portion in a direction diverging from said first stop surfaces defining a second pair of stop surfaces, said distal end terminating a distance from said upper plane forming a gap therebetween for a handle of a utensil to be extended horizontally therethrough to rest atop said flat portion between said first pair of stop surfaces and said second pair of stop surfaces.

12. The bracket of claim 11 wherein:
said lower wall extends convergingly on opposite sides of said slot in a direction from said open end to said closed end.

13. A bracket for hanging to a wall a lid with a handle comprising:
a main body including an upper portion mountable to said wall, said main body further including a lower portion spaced apart by a gap from said upper portion with said lower portion having a first end and a second end, said lower portion including hanging means located at an end of said lower portion with said hanging means having an upwardly facing stop surface operable to removably hold and retain said handle in said gap to secure said lid to said wall, said lower portion extending upwardly from said first end to said second end with said handle resting against said stop surface when mounted by said hanging means; and,
mounting means operable to secure said upper portion to said wall.

14. The bracket of claim 13 wherein:
said hanging means includes a slot at said first end in said lower portion to vertically receive a handle of a lid and further includes a curved wall located at said second end of said lower portion to horizontally receive a handle of a lid.

15. The bracket of claim 14 wherein:
said main body is a four sided channel with an upper wall extending in an upper plane, a lower wall and a pair of side walls joining said upper wall to said lower wall and defining a hollow interior, said lower wall including an outwardly opening slot to receive and hold a handle and position said handle within said hollow interior, said main body includes an upwardly extending hooked shaped wall attached to said lower wall and located at an end opposite of the location of said slot, said hooked shaped wall defining an upwardly facing surface upon which a handle may be supported.

16. The bracket of claim 15 wherein:
said lower wall extends upwardly from said hooked shaped wall to said slot when said upper wall is positioned horizontally by said mounting means, said slot includes a open end and a closed end with said closed end located closer to said hooked shaped wall than said open end allowing a handle located in said slot to normally rest against said closed end.

17. The bracket of claim 16 wherein:
said hooked shaped wall includes a flat portion coplanar with said lower wall and an outer distal end joined to said lower wall by said flat portion, said side walls extend downwardly from said upper wall toward said flat portion in a direction toward said distal end defining a first pair of stop surfaces, said distal end extends upwardly from said flat portion in a direction diverging from said first stop surfaces defining a second pair of stop surfaces, said distal end terminating a distance from said upper plane forming a gap therebetween for a handle to be extended horizontally therethrough to rest atop said flat portion between said first pair of stop surfaces and said second pair of stop surfaces.

* * * * *